United States Patent [19]

Summers et al.

[11] 4,331,319
[45] May 25, 1982

[54] BUTTERFLY VALVE

[75] Inventors: Anthony C. Summers, Morningdale; Jerry D. MacAfee, Northboro, both of Mass.

[73] Assignee: Jamesbury Corp., Worcester, Mass.

[21] Appl. No.: 127,747

[22] Filed: Mar. 6, 1980

[51] Int. Cl.³ ............................................. F16K 25/00
[52] U.S. Cl. .................................... 251/173; 251/306
[58] Field of Search ................................ 251/173, 306

[56] References Cited

U.S. PATENT DOCUMENTS

| | | |
|---|---|---|
| 1,977,351 | 10/1934 | Phillips . |
| 3,027,113 | 3/1962 | Berger . |
| 3,048,363 | 8/1962 | Garrigan . |
| 3,084,715 | 4/1963 | Scharres . |
| 3,168,279 | 2/1965 | Anderson . |
| 3,181,834 | 5/1965 | Jennings . |
| 3,260,496 | 7/1966 | Borcherdt . |
| 3,282,559 | 11/1966 | Mallonee . |
| 3,409,269 | 11/1968 | Fawkes . |
| 3,497,178 | 2/1970 | Priese . |
| 3,528,448 | 9/1970 | Urban . |
| 3,563,510 | 2/1971 | Priese . |
| 3,642,248 | 2/1972 | Benware . |
| 3,650,508 | 3/1972 | Kosmala ..................... 251/173 X |
| 3,734,457 | 5/1973 | Roos . |
| 3,986,699 | 10/1976 | Wucik . |
| 4,005,848 | 2/1977 | Eggleston ..................... 251/173 |
| 4,044,994 | 8/1977 | Priese . |
| 4,120,482 | 10/1978 | Cox . |
| 4,192,484 | 3/1980 | Scaramucci ................ 251/306 X |

OTHER PUBLICATIONS

W-K-M Valveu Publication.
Contromatics Contro-Seal Publication.

Primary Examiner—Harold W. Weakley
Attorney, Agent, or Firm—Oblon, Fisher, Spivak, McClelland & Maier

[57] ABSTRACT

Disclosed is a butterfly valve having a seat, when viewed in cross-section, of generally U-shaped configuration, and an insert configured with appropriately shaped cooperating surfaces. The sealing effectiveness of the valve is enhanced by line pressure regardless of the direction of application of such pressure, the torque characteristics of the valve are relatively low, the ability to withstand temperature cycles is good, and the seat is restrained from destructive interference with the disc.

2 Claims, 3 Drawing Figures

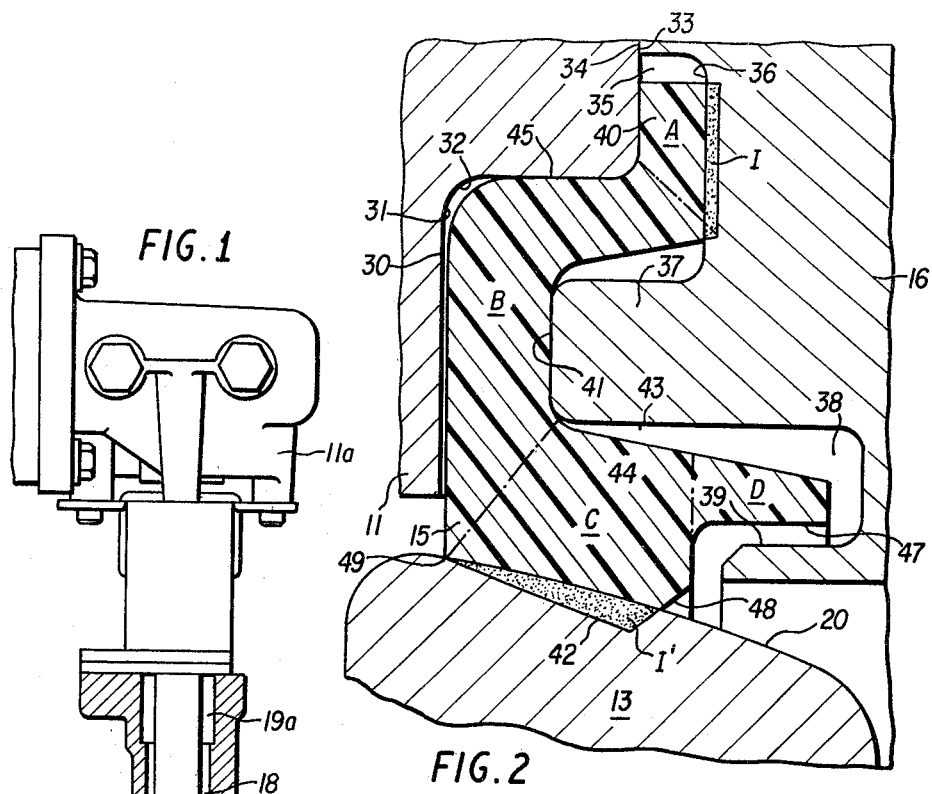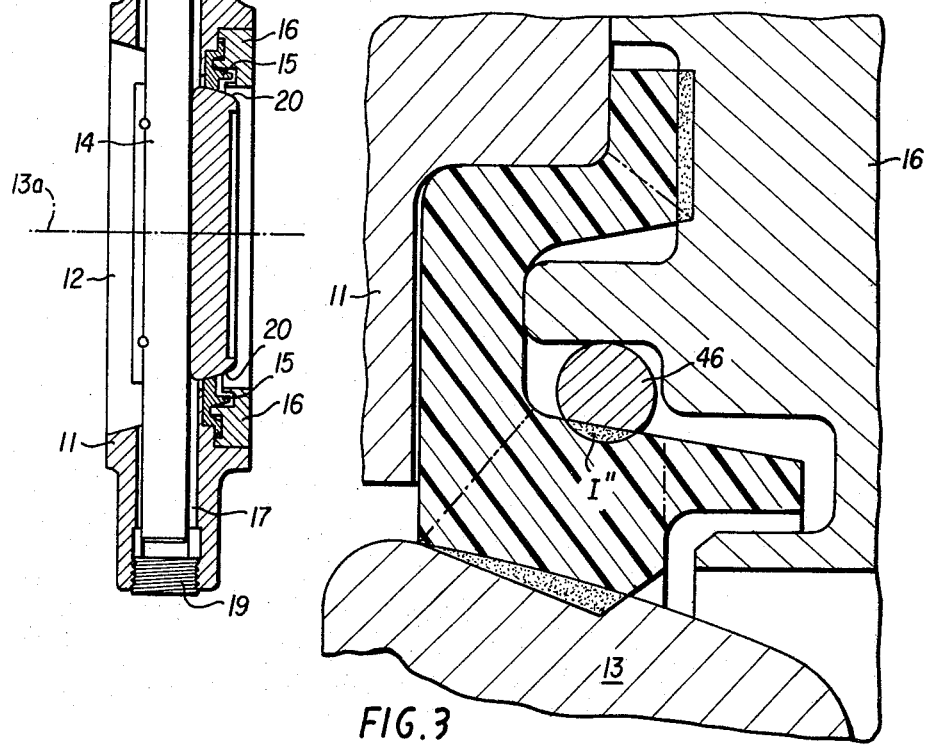

BUTTERFLY VALVE

BACKGROUND OF THE INVENTION

1. Field of the Invention

This invention relates to rotary fluid control valves of the butterfly type wherein a disc is mounted for rotation between the open position, in which the disc lies substantially parallel to the axis of the fluid flow channel through the valve, and the closed position in which the disc lies perpendicular to this axis. The disc, in its closed position, cooperates with an annular flexible seat circumscribing the fluid flow channel to shut off fluid flow through the channel. The annular flexible seat is held in position by being clamped in a recess formed between complementary surfaces of a portion of the valve body and a valve seat insert. The insert may be bolted to the valve body, or more commonly, the insert is fixed in position when the valve is bolted between the pipe flanges formed on the pipes that convey fluid to and from the valve.

2. Description of the Prior Art

With a butterfly valve of the type just described, it is desirable to provide features that will optimize the sealing effectiveness of the valve, yet minimize certain disadvantages apparent in prior art butterfly valves. For example, it is advantageous for a butterfly valve to provide a tight seal regardless of the direction of fluid flow, and continue to do so despite continuous reversal of pressure differentials across the valve. Further, pressure up to and including the full valve pressure rating should be appliable from either direction without leakage across the valve.

Butterfly valves are frequently subjected to a wide range of temperatures, both from the ambient environment in which they operate and from the flowing media being controlled. Further, the temperature will frequently cycle over a relatively wide range and it is advantageous for a butterfly valve to withstand these temperature variations without adverse effects on its sealing capabilities.

When a butterfly valve is installed for operation, it is generally bolted between pipe flanges on the fluid supply pipes. Gaskets are provided between each flange and the flange-facing side of the valve body. When the bolts are tightened, the above mentioned valve insert is compressed flush with the face of the valve body, thereby compressing the portion of the annular seat that is gripped in the recess formed between insert and body. This compression of a portion of the seat can cause distortions in the seat configuration that adversely affect the sealing contact between seat and disc edge if the disc is not fully closed during installation and can increase the force necessary to overcome the torque of the valve during opening and closing of the valve. Accordingly, it is advantageous for a butterfly valve to have a seat that is insensitive to disc position upon installation and to have torque and sealing characteristics that are not affected by flange and gasket compression.

The above mentioned advantages as well as others and the manner of their attainment, will become apparent to those skilled in the art from a consideration of this specification when taken in conjunction with the appended drawing.

SUMMARY OF THE INVENTION

The present invention is particularly applicable to those butterfly valves wherein a butterfly disc element is mounted for rotation about an axis perpendicular to the longitudinal axis of the fluid flow channel defined by the valve housing, and wherein an annular flexible seat circumscribing the fluid flow channel is positioned to cooperate with a sealing surface circumscribing the disc. This sealing surface on the edge of the disc, when viewed in cross-section, is inclined, i.e., it is a segment of a sphere 11 or could be conical.

The disc is mounted for rotation on a shaft which extends through a packing gland in the valve body to an external actuator, such as a handle. The disc is offset from the shaft, i.e., the shaft does not pass through or interrupt the disc edge sealing surface.

In the present invention, a seat-receiving groove is cut into one face of the valve housing, and an insert is provided to clamp the resilient seat in place. The insert, when viewed in cross-section, has three zones, each with a particular configuration. The radially outward-most zone has a recess to accommodate the outermost flange of the seat to facilitate clamping the seat in place. The middle zone has a protrusion that extends towards the valve body, extends into a groove formed therein and contacts the annular seat. The inner zone has another recess, deeper than that of the recess in the outer zone.

The annular seat, when viewed in cross-section, is generally U-shaped and, although integrally formed, may be considered to be divisible into four zones, each with a specific function. The radially outermost zone is a flange of relatively modest proportion, adapted to be clamped between the insert and valve housing, to hold the seal in place. The size of the flange is kept small to minimize the clamping force and to prevent undesirable distortion of the seat when the insert and housing are squeezed together when the valve is installed in the pipeline.

Moving radially inward, the next zone is a support segment that bridges the flange and sealing zone and the protrusion of the insert such that the protrusion acts as a support or fulcrum for the annular seat when it is pressurized from the shaft side. It constitutes one leg and a portion of the base of the "U", and is of such a thickness, relative to the housing and the insert, that limited axial motion is permitted. This movement accommodates minor deflections of the disc when the valve is pressurized. This zone also provides radial support of the seat since it contacts the wall of the recess cut into the valve housing and thus the inherent elastic nature of the seat material provides sealing at low pressures where pressure energization of the seat is negligible.

The next zone is the sealing zone which constitutes a portion of the radially inward leg of the "U". In cross-section, the portion facing the disc edge is also inclined, and when viewed in its entirety, the inside diameter of the unstressed seat is slightly smaller than the diameter of the disc. This relationship assures an interference fit between seat and disc when the valve is closed and thus even at low pressures the elastic internal stresses generated by this interference fit enhances sealing. One important characteristic of the present invention is that sealing effectiveness is independent of the direction of flow. When the valve is closed, the inline pressure is applied to both seat and disc. It is customary to designate the two sides of the valve as the insert side and the stem side since these elements are located at opposite ends of the valve. With increased pressure applied to the insert side of the valve, the seat geometry is such that unbalanced areas exposed to the pressure result in a sealing stress which increases proportional to the pressure differential. With increased pressure applied to the stem side of the valve, similar pressure-proportional stress increases are generated by differential areas of exposure between the disc and the point where the seat flange is clamped in the housing. Additionally, with pressure applied to the stem side, the disc displaces axially which, by virtue of a wedging action between the disc edge and the sealing surface of the seat, forces the seat radially outward into greater contact with the body of the valve. As explained more completely below with reference to the preferred embodiment, this contact serves to hold the seat firmly in place as the disc is wedged more firmly into the seat.

The fourth zone on the seat is a structural segment constituting an extension of the radially inward leg of the "U". It extends into the radially inward recess formed in the insert and serves as a stop means to prevent excessive deflection of the seat from insert side to stem side. This excessive deflection might otherwise occur when the valve is only partially closed and a high pressure differential exists across the seat. If the deflection was permitted to occur, the seat might be damaged by the disc edge as the valve was full closed.

In one embodiment of the invention, an additional member may be provided to increase the sealing stress of the seat against the disc. This member may be metallic or polymeric and may be an O-ring shaped member that is positioned between the sealing zone of the seat and the protrusion formed on the insert. Normally, this back-up member is only useful in high pressure applications.

These and other features will be described more completely in the discussion below of the preferred embodiment of the invention, taken in conjunction with the drawings.

BRIEF DESCRIPTION OF THE DRAWINGS

FIG. 1 is an elevation view, partially in cross-section of a butterfly valve as disclosed in this application;

FIG. 2 is an enlarged cross-sectional representation of the area of cooperation between the annular seat and the sealing surface of the disc of the butterfly valve as disclosed in this application;

FIG. 3 is an enlarged cross-sectional representation of the area of cooperation similar to that shown in FIG. 2 but illustrates the placement of an optional back-up supporting member.

DESCRIPTION OF A PREFERRED EMBODIMENT

With reference to FIG. 1, a butterfly valve 10 is equipped with a pneumatic valve actuator 11a, the details of which are not relevant to this invention. Valve 10 is comprised of valve housing 11 defining flow channel 12 of circular cross-section, butterfly disc 13 mounted for rotation with shaft 14, annular flexible seat 15, and a seat retaining insert 16.

The fluid flow channel 12 has an imaginary flow axis indicated at 13a. Shaft 14 is perpendicular to flow axis 13a. The shaft 14 is mounted for rotation in valve housing 11 with the aid of lower bearing means 17 and upper bearing means 18, neither of which are shown in detail. Plug 19 is inserted in the bottom of the shaft bore to retain fluid pressure inside the valve. Stuffing box means 19a, also not shown in detail, permits the emergence of shaft 14 from the upper end of valve housing 11 without the loss of internal fluid pressure.

Butterfly disc 13 is surrounded by a circumferential sealing edge 20, which is inclined with respect to flow axis 13a.

FIG. 2 illustrates, in enlargement, the area of cooperation between the valve body 11, the insert 16, the valve seat 15 and the disc 13.

Valve body 11 has formed therein valve seat receiving groove 30 having a bottom surface 31 and a side surface 32.

Insert 16 is to retain seat 15 in position in valve body 11 and has a flat complementary surface 34 that mates with a flat valve body face 33 when the valve is assembled. Insert 16, when viewed in cross-section, has three configured zones. The radially outermost zone is a groove or recess 35 having a bottom surface 36 substantially parallel to flat valve body face 33 when the insert is in place. The middle zone has a protrusion 37 that extends toward bottom surface 31 of valve body groove 30 when the insert is in place. The radially innermost zone is another groove or recess 38 which is deeper than recess 35.

Annular seat 15, when viewed in cross-section, is generally U-shaped and, although integrally formed of polymeric material, may be considered to be divisible into four zones, each with a specific function. The radially outermost zone, designated A in FIG. 2, is a flange 40 which is clamped between valve body surface 33 and insert surface 36 when the valve is assembled, and which holds the seat in position. Flange 40 also creates a seal by means of an interference fit, designated I in FIG. 2, between these insert and body surfaces to prevent leakage around the outside of the seat. The size of flange 40 is kept relatively small for the following reasons. Prior art valves with large seat flanges require, upon installation of the valve between the inlet/outlet pipes, that the disc be in the fully closed position. This is because when the valve is tightened between the pipe flanges, the forces on the valve seat flange tends to permanently deform the entire seat ring and this deformation must occur with the disc closed to assure proper conformance of the seat ring with the disc edge. In the present invention, by keeping seat flange 40 small in size, the seat does not permanently deform during installation and thus the disc may be in any location. A reason that the seat does not permanently deform is that the sealing effectiveness around flange 40 is not dependent on a tight seal-distorting squeeze between valve body and insert, but rather will seal with any load that is adequate to prevent leakage around the flange gaskets that are between the pipe flanges and the valve body.

Moving radially inward, the next zone is support segment B that bridges flange 40 and a sealing zone to be described below. Support segment B constitutes one leg and a portion of the base of the U-shape of the seal and is of such a thickness, relative to facing surfaces 41 of insert 16 and 31 of valve body 11, that limited axial motion is permitted but segment B contacts with surface 41 such that protrusion 37 acts as a support or fulcrum for the seat when it is pressurized from the shaft side. This movement accommodates minor deflections of disc 13 when the valve is pressurized. Zone B also provides radial support to the seat since it is in contact with surface 32 of valve body 11, and thus the inherent elastic nature of the seat material provides sealing at low pressures where pressure energization of the seat is negligible.

The next radially inward zone is sealing zone C which constitutes a portion of the radially inward leg of the "U". In cross-section, sealing surface 42 of zone C is inclined in the same general orientation as disc edge 20, and when viewed in its entirety, the inside diameter of seat ring 15 when unstressed is slightly smaller than the diameter of disc 13. This dimensional relationship assures an interference fit, designated as I' in FIG. 2, between sealing surface 42 and disc edge 20 when the valve is closed. As mentioned above, since zone B of the seat is in contact with surface 32 of the valve body, and since interference fit I' exists, the elastic internal stresses generated thereby enhance sealing effectiveness even at low line pressures. Relatively low operating torque, i.e., the torque moment necessary to actuate the valve is realized since zone C of seat 15 can flex into space 43 of zone C and protrusion 37 on insert 16 when the valve disc is being moved.

One important feature of the present invention is a bi-directional pressure assisted seal. It is customary to designate the two sides of a butterfly valve as the insert side (the right side in FIGS. 1-3) and the shaft side (the left side in FIGS. 1-3) since these elements are located on opposite sides of the valve. When closed and pressurized, inline fluid pressure is applied to both the seat and the disc. In the valve of the present invention, this inline pressure enhances the sealing effectiveness, regardless of whether the valve is pressurized on the shaft side or the insert side. With increased pressure applied to the insert side, the disc deflects somewhat downstream due to slight bending of shaft 14, slight clearances between the shaft 14 and its bearings 17, 18 and the compression of bearings 17, 18 by shaft 14. The geometry of seat 15 is such that unbalanced areas exposed to the pressure result in a sealing stress which increases proportional to the pressure differential. More specifically, when pressure is applied to the entire insert side of seat 15, the radially outward exposed surface 44 of zone C is larger than the radially inward exposed surface 48 of zone C and the seat is deflected both downstream and into disc edge 20 to a degree greater than the above-mentioned deflection of the disc. This seat deflection enhances the sealing effectiveness of the valve. With increased pressure applied to the shaft side of the valve, a two-fold stress versus deflection phenomena occurs in the left hand leg of zone B. The disc displaces axially (which would now be toward the right in FIGS. 1-3), which by virtue of a wedging action on the seat between the disc edge 20 and the restraining surface 32 (of receiving groove 30) increases the elastic internal stresses in the seat. Additionally, the right hand vertical surface of zone B (the inner U surface) in contact with surface 41 of protrusion 37, bends around said protrusion creating essentially compressive stresses on said internal surface and tensile stresses on the external surface. These stresses tend to increase proportionately with disc deflection. Additionally pressure will act between surfaces 32 and 45, and since this area is larger than exposed area 49 of sealing zone C, this tends to urge that seat downstream and radially inward toward disc edge 20 about surface 41 of protrusion 37. This action enhances the sealing effectiveness of the valve. In the present invention, the valve will withstand pressure reversals up to and including the full valve pressure rating without damage and will seal tightly in both directions.

In the second embodiment of the present invention, illustrated in FIG. 3, an additional support member 46 is interposed between surface 44 of zone C and insert protrusion 37. Member 46 may be metallic or polymeric, and may be an O-ring shaped member. Normally, support member 46 is only useful in high pressure application, and due to the interference fit between the member and the seat, designated as I' in FIG. 3, the sealing stress of the seat 15 against disc edge 20 is increased.

The fourth zone on the seat, designated as zone D in FIG. 2, is a structural segment constituting an extension of the radially inward leg of the "U". It extends into the radially inward recess 38 formed in the insert, and serves as a stop means to prevent excessive deflection of the seat from insert side to stem side. In some prior art valves, the pressure differential across a partially closed valve deflects the seat downstream and radially inward. Then, as the valve is being closed completely, the disc may catch on the distorted seat, fold it over, and damage same. In the present invention, this potentially damaging effect is prevented since surface 47 of zone D would engage abutment surface 39 of recess 38.

It has been found that in addition to the advantages described above, the valve of the present invention is able to withstand temperature cycles from a low of $-50°$ F. to $-100°$ F. to a high of $300°$ F. to $500°$ F. without failure. The valve has also been successfully tested to 1480 pounds per square inch which is the maximum rated pressure for ANSI Class 600 valves. The valve seat material may be a polymer such as nylon or a modified or unmodified tetrafluoroethylene.

Obviously, many modifications and variations of the invention are possible in light of the above teachings. It is therefore to be understood that within the scope of the appended claims, the invention may be practiced otherwise than as specifically taught herein.

What is claimed as new and desired to be secured by Letters Patent of the United States is:

1. A butterfly valve comprising:
   a valve housing having a seat receiving recess formed therein;
   an annular, generally U-shaped, flexible seat means positioned in said housing recess and circumscribing a fluid flow channel through said housing;
   a valve insert member on an insert side of said seat means positioned to cooperate with said housing to clamp said seat means in position;
   a valve disc mounted in said housing on a shaft side of said seat means for rotation on a valve shaft about an axis substantially perpendicular to the flow axis of said channel, said valve disc having a circumferential sealing surface on the periphery thereof to cooperate with said seat means to block the flow of fluid through said channel when said disc is closed;
   said valve housing, said valve insert member and said valve disc together comprising a radially outer flange zone, a radially intermediate support zone and a radially inner sealing zone;
   said valve housing including a valve seat receiving groove having a bottom surface and a side surface;
   said valve insert member comprising:
   (a) a surface spaced from said valve housing in said flange zone to form a clamping space;
   (b) an axial protrusion in said support zone, said axial protrusion extending towards said bottom surface of said valve housing, and
   (c) an axial recess in said sealing zone, said axial recess being axially deeper than said clamping space;
   said seat means comprising:

(a) a flange portion in said clamping space, said flange portion being axially larger than said clamping space whereby said flange portion is rigidly held and compressed between said valve housing and said valve insert, (b) a support segment in said support zone, said support segment comprising one leg and a portion of the base of said U-shape, said support segment extending between said bottom surface of said valve housing and said axial protrusion and being of an axial thickness less than the distance between said axial protrusion and said bottom surface of said valve housing, whereby limited axial motion of said support segment is permitted, the radially outer surface of said support segment being in contact with said side surface of said valve housing so as to provide radial support for said valve seat, (c) a sealing segment in said sealing zone, said sealing segment comprising a portion of the radially inner leg of said U-shape, said sealing segment having a radially outer surface and a radially inner surface smaller than said radially outer surface, said sealing segment including a sealing surface engageable with said sealing surface of said valve disc, said sealing surface of said sealing segment having an inclination similar to that of said valve disc and extending radially inward from said sealing surface of said valve disc, and (d) an extension segment in said sealing zone, said extension segment comprising an axial extension of said radially inner leg of said U-shape and extending into said axial recess of said valve insert, the radially inner surface of said extension segment being spaced from, but positioned to contact, the radially inner surface of said axial recess to form a stop means preventing excessive radial deflection of said seat;

said radially inner and outer surfaces of said sealing segment comprising first unbalanced differential areas deflecting said seat means radially inwardly and toward said shaft side when fluid pressure is from said insert side; and said radially outer surface of said support segment and a radially inner smaller exposed surface of said sealing zone comprising second unbalanced differential areas deflecting said seat means radially inwardly and toward said insert side when fluid pressure is from said shaft side.

2. The butterfly valve of claim 1, further comprising a support member interposed between the radially inner surface of said axial protrusion and said radially outer surface of said sealing segment with an interference fit therebetween so as to increase the sealing stress of said seat means against said valve disc.

* * * * *